P. SLUSTROP.
COMBINED STOVE LID AND PAN LIFTER.
APPLICATION FILED SEPT. 9, 1909.
976,512.
Patented Nov. 22, 1910.
2 SHEETS—SHEET 1.
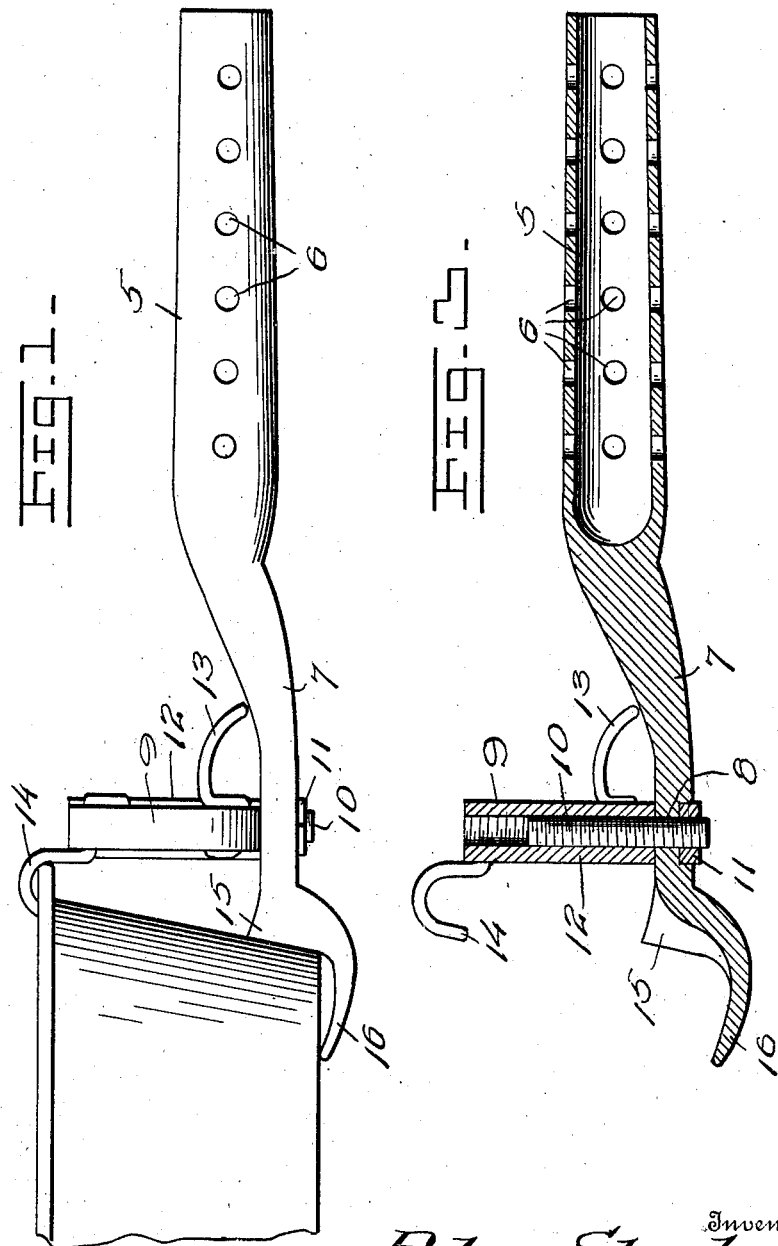
Witnesses
Inventor
Peter Slustrop
By Woodward & Chandlee
Attorney

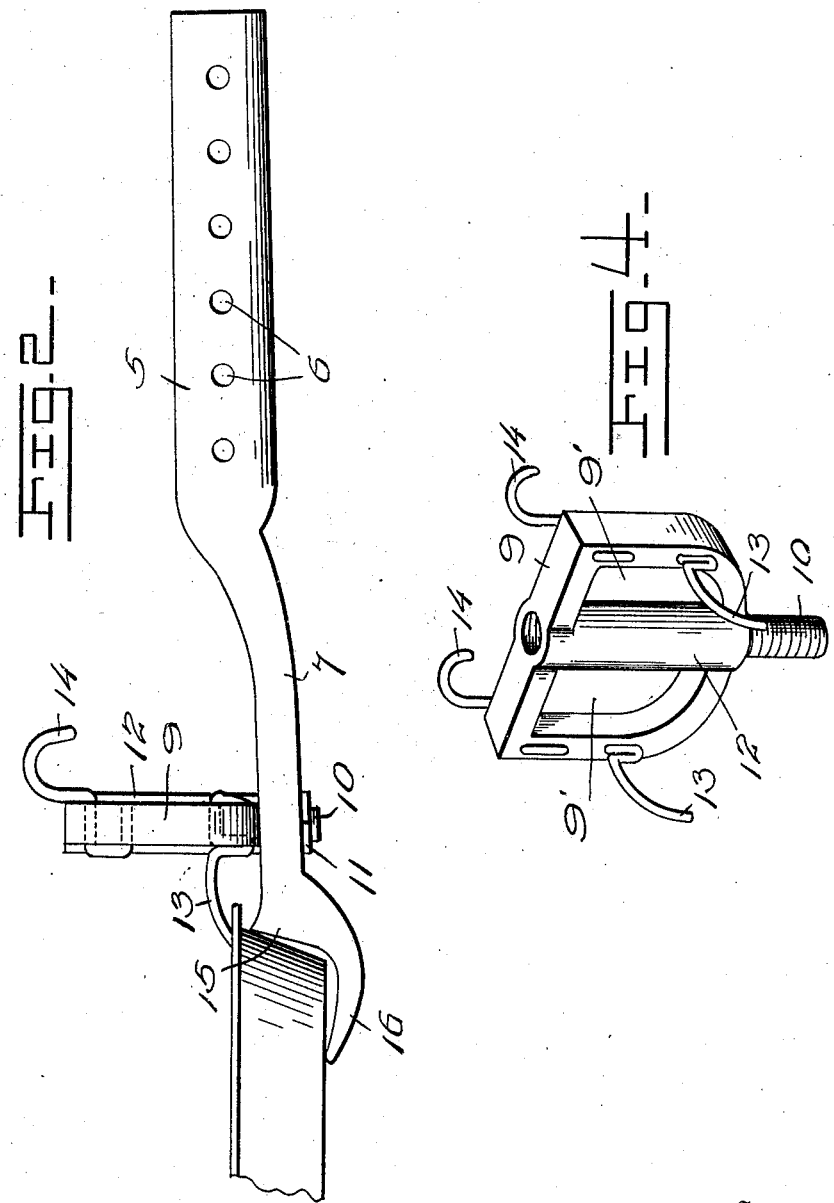

UNITED STATES PATENT OFFICE.

PETER SLUSTROP, OF HEBRON, NORTH DAKOTA.

COMBINED STOVE-LID AND PAN-LIFTER.

976,512.  Specification of Letters Patent.  Patented Nov. 22, 1910.

Application filed September 9, 1909. Serial No. 516,949.

*To all whom it may concern:*

Be it known that I, PETER SLUSTROP, a citizen of the United States, residing at Hebron, in the county of Morton and State of North Dakota, have invented certain new and useful Improvements in Combined Stove-Lids and Pan-Lifters, of which the following is a specification.

This invention has relation to certain new and useful improvements in combination lifters, and has for one of its objects to provide a device of this character which is adapted to be used for lifting the lids of stoves, and for removing bake pans, pie plates, and other kitchen articles which have become highly heated.

Another object is to provide a combined lifter of this character which may be readily converted from one use to the other, the pan engaging hooks being adjustably mounted for engagement upon pans of different depths.

A further object is to provide a device which will be strong and durable, inexpensive to manufacture and highly efficient in use.

With these and other objects in view, the present invention consists in the combination and arrangement of parts as will be hereinafter more fully described and particularly pointed out in the appended claims, it being understood that changes in the specific structure shown and described may be made within the scope of the claims without departing from the spirit of the invention.

In the drawings forming a part of this specification, and in which like numerals of reference indicate similar parts in the several views, Figure 1 is a side elevation of my improved lifter showing the same applied to a baking pan. Fig. 2 is a similar view, the lifter being applied to a pie plate. Fig. 3 is a central longitudinal section through the lifter showing the manner of adjusting the hook carrying frame. Fig. 4 is a detail perspective view of the hook frame detached.

Referring to the drawing 5 indicates the body or handle portion of the lifter which is preferably of hollow tubular formation and is provided with a plurality of openings 6 through which the heated air is adapted to escape, thus conducing to the rapid cooling of the lifter. The forward end of the lifter is downwardly curved and flattened and is provided with an opening 8 extending vertically therethrough in which is mounted the hook carrying frame 9 which is disposed upon the screw threaded pivot bolt 10, positioned in the opening 8. A nut 11 is engaged upon the lower end of the bolt 10. This nut is seated in a recess provided in the under side of the shank of the lifter, and is adapted to prevent any rotative movement of the bolt. The hook frame 9 is substantially rectangular in form, and is formed with a central tubular portion 12 which is provided with interior screw threads for engagement with the threads of the bolt 10. The frame is also provided with openings 9′ which greatly lighten the lifter and facilitate its easy manipulation. Hooks 13 are secured in the frame and extend laterally from the side thereof adjacent to its lower end. These hooks are adapted to engage with the flange of an ordinary pie plate in the use of the device as will be later described. Another pair of hooks 14 are also secured at the top of the frame and extend from the opposite side thereof. These hooks are adapted to engage with the flange of the ordinary bake pan as is clearly shown in Fig. 1. It will be noted that the hooks 13 are curved to a less degree than the oppositely positioned hooks 14. This is due to the usual difference in shape and depth of the pans with which the hooks are engaged. The shank portion 7 of the handle 5 is extended forwardly of the hook frame 9, and is formed with the transverse extensions 15 and the outwardly curved tongue 16. The tongue 16 is downwardly curved and is adapted to engage in a recess which is provided in the top of the ordinary stove lid.

In the use of the device, when it is desired to lift pie plates or other shallow cooking utensils, the tongue 16 is engaged with the bottom of the plate, and the hooks 13 are positioned over the circumscribing flange portion thereof as is clearly shown in Fig. 1. The hook frame 9 may be adjusted upon the bolt 10, until the required distance is secured for the proper engagement of the hooks. The pan and its contents may then be lifted and removed from the oven of the stove. When it is desired to apply the device to bake pans or other utensils of considerable depth, the frame 9 is adjusted upon the bolt 10 and the hooks 14 positioned outwardly toward the tongue 16. The tongue and hooks are engaged with the side of the pan as previously described, when the same may be readily lifted and removed from place to place.

By providing the openings 6 in the tubular handle 5, the heat of the pan which is imparted to the metal handle will be passed off through these openings, so that the handle will cool very rapidly and prevent burning of the hands of the user. It will be understood that the bolt 10 may be integrally formed with the shank 7 of the handle, but for convenience in manufacture, these members are separately formed. The hook frame and the lifter proper may be conveniently manufactured of cast iron, while the bolt 10 would preferably be formed of steel.

From the foregoing it will be seen that I have provided a very useful and highly efficient device which may be used as a stove lifter, or a plate or pan lifter without the necessity of removing any of its parts or adjusting the same. It will be obvious, however, that the hook frame may be readily removed when not desired for use.

My improved lifter and holder is very simple in its construction, permitting the same to be produced at a low cost, and owing to the variety of uses to which it is adapted forms a very convenient and desirable household article. It is also highly efficient and practically indestructible in use.

What is claimed is:

1. A combined pan and stove lid lifter comprising a tubular handle having a longitudinally extending flattened shank, transverse extensions at the outer end of said shank, a downwardly and outwardly curved tongue integrally formed with said shank, a vertically adjustable rectangular frame mounted on the shank, pan engaging hooks secured in the frame, said hooks extending laterally therefrom upon opposite sides and adjacent to the top and bottom of the frame, said tongue and hooks being adapted to engage with a pan substantially as described.

2. A combined pan and stove lid lifter comprising a tubular handle having a plurality of openings formed therethrough, a longitudinally extending shank portion integrally formed with said handle, said shank being transversely extended at its outer end, a downwardly curved tongue extending outwardly from the shank, a screw threaded bolt vertically positioned through the shank, a substantially rectangular frame mounted on said bolt, said frame having an interiorly threaded centrally disposed tubular portion adapted to engage with the threads of the bolt, said frame being adjustable thereon, and a plurality of laterally extending hooks secured adjacent to the top and bottom of the frame on each side thereof, said hooks and tongue being adapted to engage with a pan substantially as described.

3. A device of the class described comprising a handle a lower engaging member carried thereby, a vertical support portion spaced inward of the engaging member on the handle, and a frame movable thereon and carrying oppositely disposed vertically spaced engaging portions adapted for engagement with different sizes of pans in coöperation with the engaging member, said frame being revoluble to present either of said engaging portions in vertical opposition with the engaging member, and being vertically movable on the support for adjustment to various sized pans.

4. A combined pan, and stove lifter, comprising a tubular handle provided with a plurality of perforations, a shank portion formed integral with said handle, said shank portion terminating in a downwardly curved member adapted to engage the lid of a stove, a projection formed upon said shank adjacent its curved end, said projection being provided with a squared portion adapted to contact with the side wall of a pan, a screw threaded bolt adjustably supported by said shank, a substantially rectangular frame, a screw threaded barrel arranged centrally upon said frame, said bolt being adapted to enter said barrel, and a plurality of hooks secured to said frame.

In testimony whereof I affix my signature, in presence of two witnesses.

PETER SLUSTROP.

Witnesses:
J. H. WATTS,
W. T. SCHOLZ.